United States Patent [19]

O'Dowd et al.

[11] Patent Number: 4,555,347

[45] Date of Patent: Nov. 26, 1985

[54] IODINE DISINFECTION DISPENSER

[76] Inventors: Dennis H. O'Dowd, 4070 Old Dundas St. W., Toronto, Ontario M6S 2R6; George W. J. Barry, 2063 Lakeshore Blvd. W., Toronto, Ontario M8V 1A1, both of Canada

[21] Appl. No.: 602,353

[22] Filed: Apr. 20, 1984

Related U.S. Application Data

[63] Continuation-in-part of Ser. No. 441,909, Nov. 15, 1982, abandoned.

[51] Int. Cl.⁴ .............................................. C02F 1/50
[52] U.S. Cl. .............................. 210/752; 137/101.11; 137/268; 210/753; 210/764; 210/766; 210/95; 210/199; 210/206; 210/283; 422/37; 422/278; 422/279
[58] Field of Search ........................ 137/101.11, 268; 210/668, 742, 753–756, 764, 192, 198.1, 205, 206, 283, 284, 95, 149, 752, 766, 199, 257.1; 422/37, 267, 274, 275, 278, 279

[56] References Cited

U.S. PATENT DOCUMENTS

| | | | |
|---|---|---|---|
| 2,419,845 | 4/1947 | Merrick | 422/278 |
| 2,604,446 | 7/1952 | Palmer | 137/268 |
| 2,647,871 | 8/1953 | Frazier | 210/198.1 |
| 3,195,558 | 7/1965 | Klueber et al. | 210/206 |
| 3,202,164 | 8/1965 | Thompson et al. | 137/101.11 |
| 3,846,078 | 11/1974 | Brett | 210/198.1 |
| 3,915,857 | 10/1975 | Olson | 210/754 |
| 4,051,034 | 9/1977 | Amon et al. | 210/206 |
| 4,059,522 | 11/1977 | Polley et al. | 210/753 |
| 4,070,292 | 1/1978 | Adams | 210/195.1 |
| 4,152,262 | 5/1979 | Rose | 210/206 |
| 4,199,001 | 4/1980 | Kratz | 422/264 |
| 4,391,287 | 7/1983 | Konoshima | 210/206 |

FOREIGN PATENT DOCUMENTS

| | | | |
|---|---|---|---|
| 0200078 | 3/1958 | Austria | 137/268 |
| 1114786 | 10/1961 | Fed. Rep. of Germany | 210/205 |
| 525463 | 11/1976 | U.S.S.R. | 210/149 |

Primary Examiner—Peter Hruskoci

[57] ABSTRACT

A method of, and a device for, providing a disinfectant carried by a water supply flowing through a conduit, comprising introducing a predetermined portion of the water into a sealed container having a reservoir and a chamber below the reservoir in intercommunication therewith, the reservoir holding a quantity of iodine crystals and being of a predetermined size sufficient to hold a quantity of water proportional to the maximum flow rate attainable through the conduit and such that a minimum concentration of 120 parts per million (milligrams per liter) is obtainable as an outflow from the container when the supply of water is at least above freezing, the predetermined portion of the water being introduced into the chamber and outflowing from the reservoir above the iodine crystals whereby all said water portion passes between the iodine crystals. The device includes inlet means opening into the chamber and outlet means opening from the reservoir above the iodine crystals.

21 Claims, 8 Drawing Figures

IODINE DISINFECTION DISPENSER

This is a continuation-in-part of U.S. patent application Ser. No. 441,909 filed Nov. 15, 1982, now abandoned in the names of Dennis Hardy O'Dowd and George William John Barry enitiled Iodine Disinfection Dispenser.

FIELD OF THE INVENTION

This invention relates to a method and a device for dispensing a disinfectant level of iodine using a water supply.

BACKGROUND OF THE INVENTION

Iodine has been found to be an effective and economical means of water purification by disinfection. Iodine has advantages over chlorine for the disinfection of water because it does not add any color, odor or taste to the water at normal treatment levels and does not readily combine with other chemicals. Also iodine is simpler to use, require less maintenance, and is relatively more chemically inert than chlorine. Therefore it is particularly advantageous for use in purifying rural water supplies and those in developing countries. If there is concern regarding the consumption of iodine, simple carbon filtration will remove the iodine, after the initial purification step, although the water will be left without a protective residual.

Another advantage of iodine is its use as a disinfectant in association with food processing, for instance for cleaning containers or dishes. Presently iodophors are used for this purpose, i.e. iodine in combination with a detergent.

Iodine in sufficient concentration will completely inactivate the coliform group under most practical situations where total coliforms in the raw water do not exceed 1,000 per 100 milliliters (ml). Iodine will dissolve in water, provided no iodides are present, at a maximum concentration (saturation) of 147 parts per million (ppm) or milligrams per liter (mg/l) at a water temperature just above freezing and 300 ppm or mg/lat 26° Centigrade. In this specification the term "above freezing" means that state where the water retains a minimum number of calories which would keep its temperature less than one degree Centigrade but which would maintain the water in a liquid state. The concentration for effective disinfection of water to render it potable is a residual of 0.5 ppm or mg/lretained for 15 minutes above 7.2° C. (45° F.) and 30 minutes below that temperature. Studies have indicated that such concentrations produce no harmful physiological effects to those consuming the water.

Iodine has also been found to act as a superior disinfectant for sanitizing inanimate objects where limited organic contamination may be present and where reduced occurrence of corrosion is necessary as has been determined by the U.S. Environmental Protection Agency (EPA) and the U.S. Department of Agriculture (USDA). Concentrations normally used are limited to levels of 25 mg/lor less where iodine might become an incidental additive to food products and levels as high as 75 mg/lwhere more thorough disinfection is required.

Iodine's efficacy as an anticeptic for the disinfection or sanitizing of living tissue is also well documented in the medical literature and by the U.S. Federal Drug Administration (FDA) and the U.S. Department of Agriculture (USDA). It is an object of the present invention to provide levels of iodine up to 1100 mg/lto achieve antisepsis, disinfection and sanitization as set out in EPA, FDA and USDA definitions.

DESCRIPTION OF THE PRIOR ART

Devices known as iodinators have been developed to introduce controlled amounts of iodine continuously into a water supply system and a device of this type is sold by Iomech Limited of Toronto, Canada. In such a device a closable cylinder, preferably made of polyvinylchloride (PVC), holds a quantity of iodine crystals. Inlet and outlet tube fittings project laterally from the cylinder for connection of the device, as a bypass, to the supply line of a water system to be purified. A proportion of water flowing through the supply line redirected through the cylinder and picks up a quantity of iodine which is dissolved in it. On re-entry into the main flow line the iodine solution is diluted to the required concentration for effective disinfection, the flow through the cylinder being controlled by valve means in the bypass circuit to achieve the desired concentration level. After the addition of the iodine into the water it must be held in a retention tank for at least fifteen minutes for effective disinfection.

The main problem associated with the use of such an iodinator is that it must be recharged with iodine crystals from time to time and if this is done improperly it reduces the reservoir capacity, i.e. the amount of water retained temporarily within the cylinder. Overcharging the device may substantially interfere with the volume of full saturated solution available for injection into the water supply and at a higher flow rate a concentration of iodine below the permissive limit may occur because the water passing through the iodinator is not saturated with iodine.

Other types of devices are also known for use in the iodine disinfection of water, one such device being disclosed in U.S. Pat. No. 4,059,522 issued Nov. 22, 1977 to Iodinamics Corporation assignee of Richard D. Polley et al. entitled Apparatus for Purifying Water. In the Polley device, water to be disinfected is first run down through an annular inflow column and then upwardly through a coaxial central outflow column of iodine crystals, the central column being separated from the outer annular column by a pervious distributor cap and an impervious column wall. If cold water is run through the Polley device at a rate sufficient to supply peak household needs the rate of dissolution of the iodine would not be sufficient to render the water in the system potable.

Another known device is disclosed in U.S. Pat. No. 4,152,262 to Rose issued May 1, 1979. In the Rose patent a proportion of the water from a flow line enters a reservoir in the device which holds iodine, passing over the crystals and out through an exit channel. The problem with the Rose device is that contrary to the assertion of that inventor, the water will not necessarily become saturated with iodine. Iodine does not act like a salt, which goes immediately into solution, but requires time to saturate the water, the length of time depending upon the temperature, flow and hydrostatic pressure of the water and the degree of surface area of contact with the iodine crystals.

Yet another known device is disclosed in U.S. Pat. No. 2,419,845 to Merrick issued Apr. 29, 1947 which shows a cylindrical cartridge of iodine with a concentine perforated inlet pipe. Merrick's device is connectable directly in the flow line and is not a proportioning device, which means that the water does not necessarily remain in contact with the iodine long enough to acquire a sufficient amount of iodine in solution to act as a disinfectant.

U.S. Pat. No. 3,195,558 issued July 20, 1965 to Kleuber discloses an iodine proportioning device but in that device the presence of a shunt allows liquid to pass through the device with iodine adulteration but not necessarily in the required proportion, especially since iodine-free water is of less specific gravity than water containing iodine.

The applicant has found that by providing an iodinator having a predetermined minimum reservoir capacity relative to the maximum flow through the water supply, a minimum required concentration of iodine entering the water supply system is assured sufficient not only to disinfect the water but to provide a sanitizer, a disinfectant or an antiseptic for appropriate uses.

Recharging also requires a container having a removable cap which makes it vulnerable to tampering. Because of the toxicity of iodine, having a container with an easily removable cap makes the device dangerous especially to children and for use in the presence of food. Also an openable container is vulnerable to adulteration.

It is therefore another object of the present invention to provide a sealed, disposable iodinator.

An ancillary problem arises if PVC is used as the material forming the container because PVC deteriorates when continuously exposed to sunlight over a prolonged period of time during which the device of the present invention is usable, especially in tropical countries. This causes a danger of rupture and the consequent escape of the toxic contents. It is a further object of the invention to provide an iodinator having a PVC container which is resistant to deterioration by sunlight.

It has been found that low levels of iodine (under 10 mg/l) permit growth of certain pathenogenic bacteria and it is an object of this invention to sustain a minimum of 120 mg/l to prevent this occurrence (see Proceedings of the International Symposium on Povidone, University of Ketucky College of Pharmacy, Apr. 17–20, 1983).

It has also been found that the presence of iodides drastically reduces the ability of aqueous iodine to kill bacteria and therefore it is an object of this invention to isolate incoming organic material or other materials which would encourage the formation of said iodides were they allowed to block or reside in the iodine crystal bed.

SUMMARY OF THE INVENTION

In its broadest aspect the invention consists of a method of, and a device for, providing a disinfectant carried by a water supply flowing through a conduit, comprising introducing a predetermined portion of the water into a sealed container having a reservoir and a chamber below the reservoir in intercommunication therewith, the chamber containing filter the reservoir holding a quantity of iodine crystals and being of a predetermined size sufficient to hold a quantity of water proportional to the maximum flow rate attainable through the conduit and such that a minimum concentration of 120 parts per million (milligrams per liter) is obtainable as an outflow from the container when the supply of water is at least above freezing, the predetermined portion of the water being introduced into the chamber and outflowing from the reservoir above the iodine crystals whereby all said water portion passes through the filter material and between the iodine crystals. The water is carried by inlet means opening into the chamber and outlet means opening from the reservoir above the iodine crystals.

BRIEF DESCRIPTION OF THE DRAWINGS

An example embodiment of the invention is seen in the accompanying drawings in which.

DESCRIPTION OF PREFERRED EMBODIMENT

Figure 1:
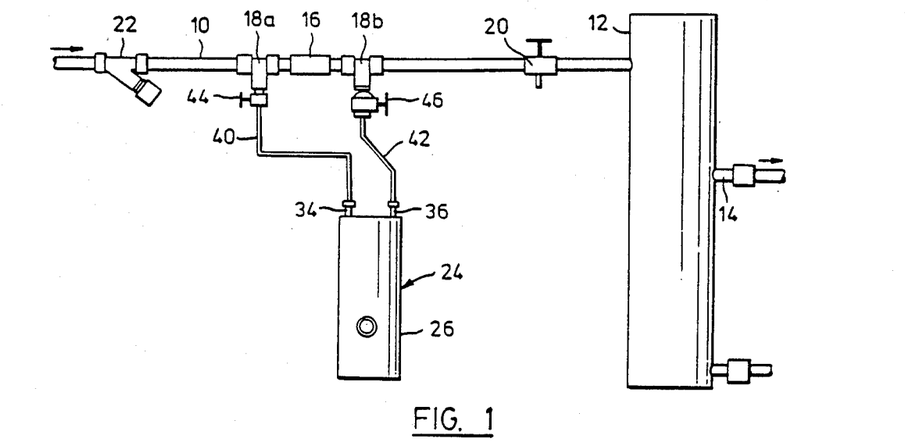
FIG. 1 shows an iodine treatment system of the invention.
Figure 2:
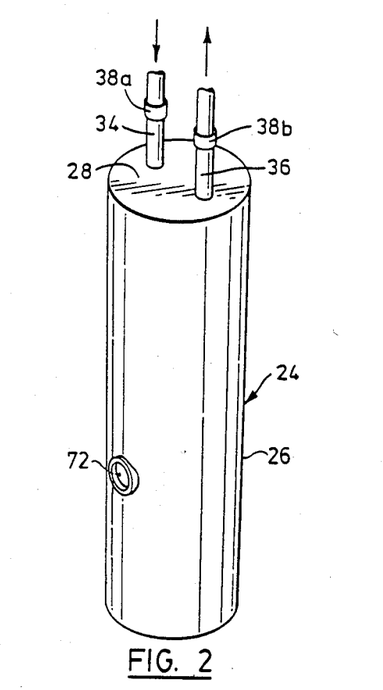
FIG. 2 is a perspective view of an iodine dispenser of the invention used in the treatment system of FIG. 1.
Figure 3:
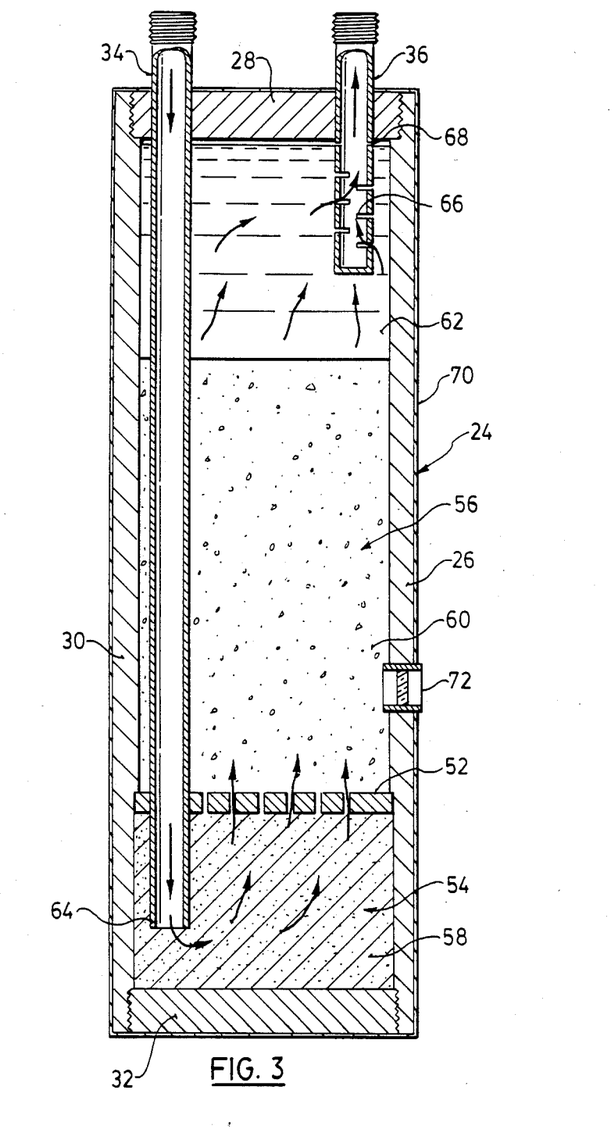
FIG. 3 is a cross-sectional view in elevation of the dispenser shown in FIG. 2.

The example embodiment of FIGS. 1 to 3 of the drawings shows the use of an iodine dispenser in an iodine treatment system having an inflow pipe 10 leading from a water source (not shown) under pressure to a retention tank 12 and thence through an outflow pipe 14 to a distribution system (not shown). Upstream from retention tank 12 a flow control choke 16 is located in inflow pipe 10, bracketed by a spaced pair of tee junctions 18, one tee junction 18a being located upstream of the choke and the other tee junction 18b being located downstream of the choke. Elsewhere inflow pipe 10 carries a flow control valve 20 (downstream from tee junction 18b) and a strainer 22 (upstream from tee junction 18a) or other device for sediment removal.

An iodine disinfection dispenser 24 consists of a closed cylindrical container 26 having a top end 28, a side wall 30 and a bottom 32. An inlet tube 34 and an outlet tube 36 open from the top end 28 of the container.

Inlet tube 34 carries a threaded fitting 38a, which allows that tube to be connected by a line 40 to upstream tee junction 18a. Similarly outlet tube 36 of container 26 carries a threaded fitting 38b which allows that tube to be connected by a line 42 to downstream tee junction 18b. Line 40 carries a shut-off valve 44 and line 42 carries a flow control valve 46.

Container 26 defines a closed chamber divided by a perforated plate 52 into a precipitation chamber 54 below a reservoir 56. Precipitation chamber 54 may be empty of solid material but it is preferably filled with a bed 58 of sand or other suitable filter medium such as glass beads or charcoal fibre that will not absorb iodine while reservoir 56 is partially filled with a bed 60 of iodine crystals. The perforations of plate 52 are smaller in diameter, preferably less than 1 mm, than the iodine crystals of bed 60 to retain the crystals above the plate.

Inlet tube 34 extends downwardly through reservoir 62 and through perforated plate 52 and terminates at its lower end 64 in filter bed 58 in precipitation chamber 54 adjacent bottom 32. Outlet tube 36 extends downwardly into reservoir 62 and terminates above or within iodine bed 60. A plurality of slots 66, narrower in lateral dimension than the diameter of the iodine crystals in bed 60, open laterally from the lower portion of outlet tube 36 allow for the passage of iodine saturated water from reservoir 62 into the tube and small pinholes 68 open laterally from the upper portion of the tube adjacent top 28 to allow for the passage of air.

The presence or absence of iodine within dispenser 24 may be ascertained by means of a refractor 72 located in side wall 30 of container 26 opening into the lower portion of reservoir 56. Refractory 72 is preferably made of translucent plastic such as a fluoropolymer which will be etched by the iodine to frost its inner side so that when the level of bed 60 iodine crystals in reservoir 56 is sufficiently high no reflection is cast on the refractor but when the iodine bed falls below the refractor the plastic will reflect a white colour. Container 26 of dispenser 24 has a body of polyvinylchloride or other plastic material capable of preventing the migration of iodine to the exterior surface of the container, with an outside metal coating 70 of light reflective material such as aluminum to prevent ultraviolet degradation of the plastic material, to show by discoloration any leakage of migration of the iodine, and to identify unauthorized tampering. Of course container 26 may be made of any material acceptable for use in such water systems and resistant to attack by iodine, and coating 70 may not necessarily be used.

In the operation of the device, dispenser 24 is connected by lines 40 and 42 to inflow pipe 10 of the water supply as described above and shown in FIG. 1. Valve 44 is opened to allow a proportion of the water flowing through pipe 10 to pass, because of pressure created by choke 16, into container 26 through filter bed 58 and through perforated plate 52 the water passes upwardly and into reservoir 56 through iodine bed 60. From reservoir 56 the saturated liquor passes through slots 66 into outlet tube 36 and back into inflow pipe 10 and thence to retention tank 12. The water in reservoir 56 is saturated with iodine from the bed 60 of iodine crystals because the water must pass through the crystals to reach the reservoir.

The proportional flow of water through dispenser 24 is adjustable by valve 46 or other suitable means. To provide disinfectant under minimum solubility conditions for the iodine, i.e. where the temperature of the water is close to 0° C., the amount of saturated water held in reservoir 56 must be a minimum volume dependent upon the maximum flow rate of the water through pipe 10 and the proportional amount of water bypassed through dispenser 24 with valve 46 fully open. If the proportional amount of water bypassed through dispenser 24 is 1/000 the flow through the water supply and the maximum flow through pipe 10 is 45 liters per minute then the minimum volume of reservoir 56 must be one liter to provide a saturated mother liquor in the reservoir at all times whereby the amount of iodine entering the water supply at tee joint 18b is minimally 0.5 parts per million at close to 0° C. or approximately 1.0 parts per million at 26° C.

The amount of iodine crystals present in dispenser 24 is not critical as long as sufficient crystals are present to maintain the mother liquor in reservoir 56 at a saturation level. For the average domestic water supply three pounds of iodine crystals will enable the dispenser to be operable for several years. This extended use enables the dispenser to be sealed against opening and the empty container may be discarded in compliance with regulations disallowing the refilling of disinfectant containers when the iodine in the container is used up as may be ascertained by viewing the color of refractor 72 or by other means such as weight differential or direct testing by titration. The sealed nature of container 26 prevents the possibility of recharging dispenser 24 which could reduce the volume of reservoir 56 below the minimum required for proper supply of disinfectant. Being sealed, dispenser 24 is also tamper proof and has the further added advantage that it will not burst under reasonable pressures which might cause a replacable lid to be blow off. In this respect pinholes 68 in outlet tube 36 create a small air pocket in the top portion of reservoir 56 adjacent top 28 of container 26, which will act as a cushion against hydraulic hammering under fluctuating pressure conditions.

For any water supply having a maximum flow rate less than the maximum which a given dispenser of the invention may be constructed to service, the maximum flow rate through the dispenser, which is proportional to that of the supply, may be adjusted by valve 46. A standard test of the water downstream from the dispenser can be taken by drawing a sample of the treated water from the outlet of retention tank 12.

Pre-filtration to remove gross matter may be required to prevent plugging of the valves or tubing of the system, which would affect its proper operation, and strainer 22 of a standard type may afford such protection.

The size of the inlet tube 34 is preferably larger in diameter than the size of outlet tube 36 to preserve the uniformity of filter bed 58 and also to prevent an incorrect attachment of the dispenser to the supply system, fittings 38a and 38b being of different sizes to emphasize the distinction.

Since some fine sedimentary matter will be trapped in filter bed 58, either from the incoming water or by precipitation from upper chamber 56, as by the precipitation of metal ions from reservoir 56 due to a change in pH caused by the aqueous iodine, dispenser 24 may be disconnected from inflow pipe 10 and connected, through fittings 38a and 38b, to a reverse flow system to flush out the sediment from the chamber.

Figure 4:
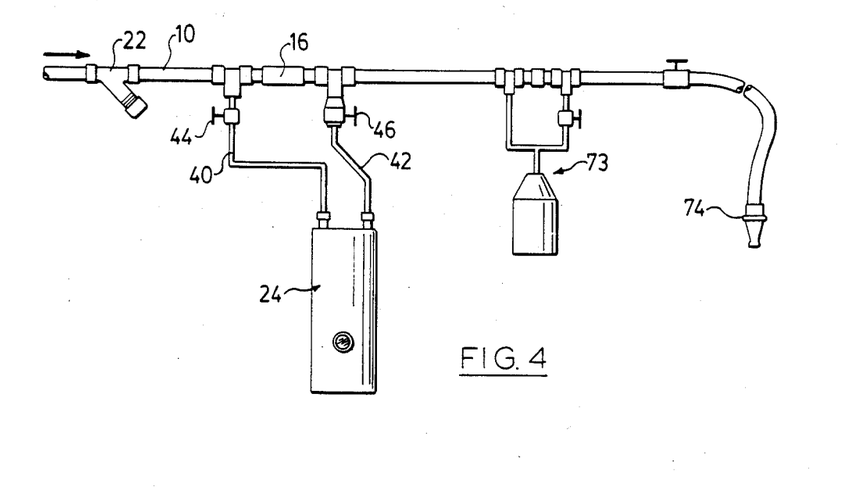
FIG. 4 shows a system similar to FIG. 1 but delivering a disinfectant and detergent to a wash-down hose.

FIG. 4 shows on variation in the use of the system of FIG. 1 in which a detergent feed system 73 is connected to inflow pipe 10 downstream from the iodine supply instead of retention tank 12 and a wash-down hose 74 is connected to the downstream end of the inflow pipe. In yet another variation detergent and/or acid are added downstream of the iodine supply to produce an iodophor type of product.

Figure 5:
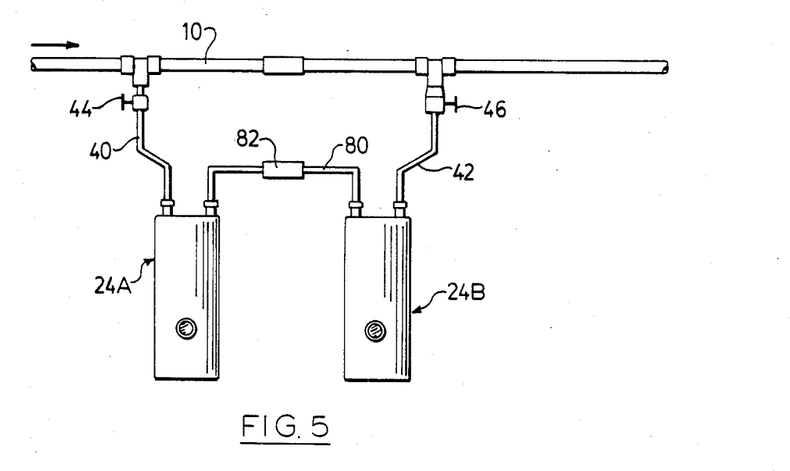
FIG. 5 is a view similar to FIG. 1 showing the use of two of the dispensers of FIGS. 2 and 3 in tandem.

The embodiment shown in FIG. 5 of the drawings provides for use of two dispensers 24A and 24B in tandem, outlet tube 36 of dispenser 24A being connected to inlet tube 34 of dispenser 24B by a line 80 through a choke 82. This arrangement provides a total reservoir 62 of larger capacity in the system, which allows a greater amount of flow to be purified or disinfected. Also, if the first dispenser is exhausted before it can be replaced the second dispenser will continue to perform the required function.

Figure 6:
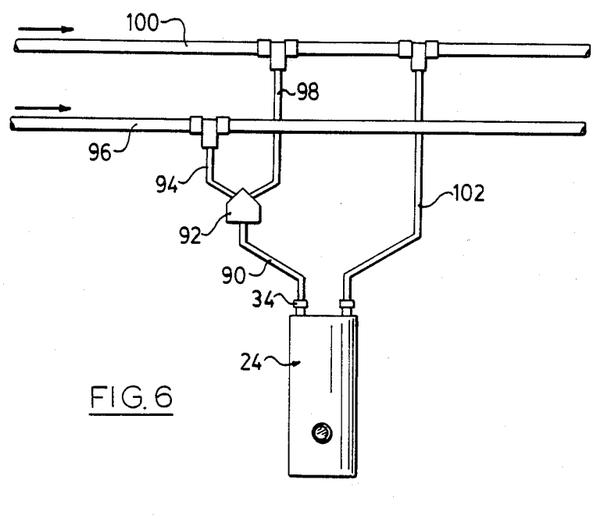
FIG. 6 is a view similar to FIG. 1 showing use of the dispensers of FIGS. 2 and 3 with a temperature control valve.

The embodiment of FIG. 6 provides temperature control for the water flowing into dispenser 24. In this embodiment inlet tube 34 of dispenser 24 is connected by a line 90 to a temperature control valve 92 which is in turn connected by a line 94 to a hot water inflow pipe 96 and by a line 98 to a cold water inflow pipe 100. Outlet tube 36 is connected by a line 102 to cold water pipe 100. Temperature control valve 98 is set to provide a predetermined flow mixture of hot and cold water which will affect the solubility rate of the iodine in reservoir 56, i.e. a warmer mixture will increase the amount of iodine taken up by the water in the dispenser and therefore either the concentration of iodine in the dispenser is controllable or the capacity of flow through the dispenser may be increased.

Figure 7:
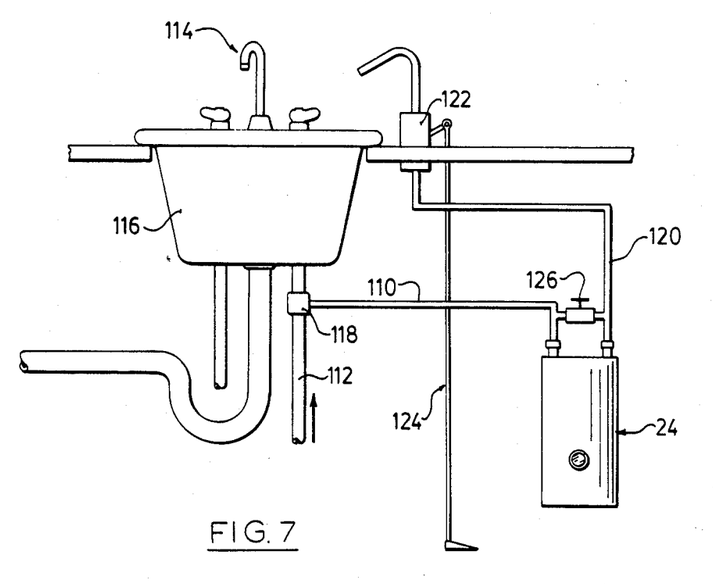
FIG. 7 shows the iodine treatment system used to provide a disinfectant for a washstand.

FIG. 7 is another example embodiment of the invention, showing its use in providing a disinfectant or antiseptic for a sink or wash-basin. In this embodiment a line 110 connects inlet tube 34 of dispenser 24 with the cold water inflow line 112 to tap 114 of a wash-basin 116, for instance by a self-tapping connection 118. Another line 120 connects outlet tube 36 with a fawcet 122 which may be operated by a foot treadle system 124. An adjustable choke valve 126 interconnects lines 110 and 120. In this embodiment incoming water becomes a disinfectant or antiseptic by the use of dispenser 24 and it is made available through fawcet 122, the amount of iodine present in the disinfected water may be varied by means of control valve 126 which governs the proportion of water bypassed into dispenser 24.

Figure 8:
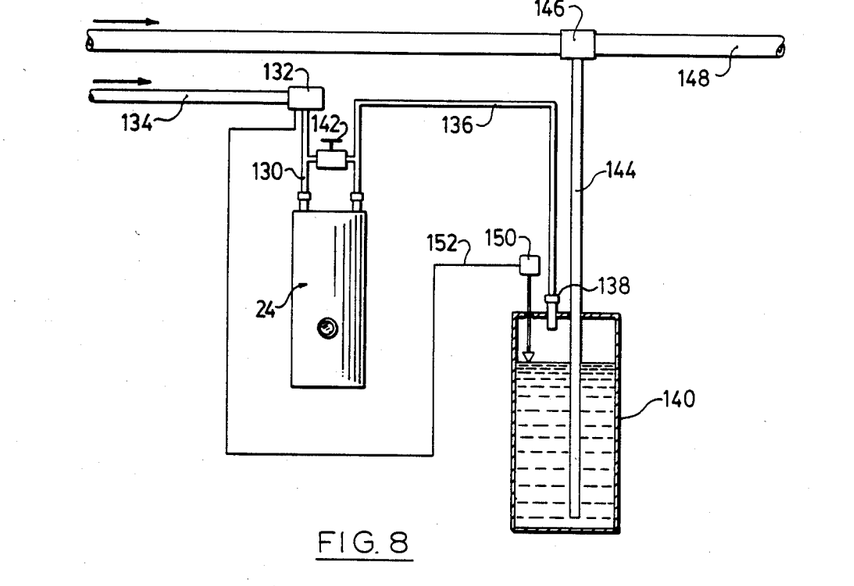
FIG. 8 shows an iodine treatment system similar to FIG. 5 used to disinfect effluent.

The invention may be used to disinfect an outflow, such as sewage effluent, as seen in FIG. 8 of the drawings which shows dispenser 24 having its inlet tube 34 connected by a line 130 through a first control valve 132 to an inflow pipe 134 and its outlet tube 36 connected through a line 136 to the inlet 138 of a solution tank 140. A second control valve 142 connects lines 130 and 136. An outlet line 144 extends from the bottom of solution tank 140 to a venturi 146 located in a sewage outflow pipe 148. A control float 150 is connected electrically or mechanically by a line 152 to operate first control valve 132.

In the operation of the embodiment of FIG. 8, second control valve 142 is adjusted to provide the desired proportional bypass of water through dispenser 24 to give the desired concentration of iodine in the outflow passing into solution tank 140. The level of the liquid in solution tank 140 is controlled by float 150 which opens and closes first control valve 132 as required. The quantity of effluent flowing through outflow pipe 148 determines the amount of disinfectant liquid drawn by venturi 146 from solution tank 140. In this disclosure the term "supply of water" includes sewage effluent.

We claim:

1. A method of providing a disinfectant carried by a supply of water flowing through a conduit, comprising introducing a predetermined portion of the water into a sealed container having a reservoir and a chamber below the reservoir in intercommunication therewith, the chamber containing a bed of filter material, the reservoir holding a quantity of iodine crystals lying in a bed in the bottom portion of the reservoir and being of a predetermined size sufficient to hold a quantity of water proportional to the maximum flow rate attainable through the conduit and such that a minimum concentration of 120 parts per million (milligrams per liter) is obtainable as an outflow from the container when the supply of water is at least above freezing, the predetermined portion of the water being introduced into the chamber and through a first tube having an outlet portion opening into the chamber and outflowing from the reservoir through a second tube opening into the reservoir above the iodine crystals said second tube projecting into the reservoir and closed at the end thereof, and carrying a plurality of slots adjacent the closed end of the passage of water, the slots being of a size to prevent the passage of crystalline iodine therethrough whereby all said water portion passes through the filter material and between the iodine crystals.

2. A method as claimed in claim 1 in which the filter material is sand.

3. A method as claimed in claim 1 including the step of retaining the outflowing water, before delivery from the supply, for a period ranging from thirty minutes where the water temperaturre is close to freezing to fifteen minutes where the water temperature is above 7.2° C., whereby the treated water is potable.

4. A method as claimed in claim 1 including the step of introducing a detergent into the supply of water downstream from the reservoir outflow.

5. A method as claimed in claim 1 including the step of introducing the outflow of said container into a second said container.

6. A method as claimed in claim 1 including the step of controlling the temperature of the water being introduced into the container whereby the concentration of iodine in the outflow is facilitated.

7. A method as claimed in claim 1 including the step of passing the outflow from the container into a dispenser.

8. A method as claimed in claim 1 including the step of passing the outflow from the container into a holding tank and drawing water from the holding tank into a further conduit of liquid proportional to the flow therethrough.

9. A device for providing a disinfectant carried by a supply of water flowing through a conduit, comprising:
a sealed container having a reservoir and a chamber below the reservoir in intercommunication therewith, the reservoir holding a quantity of iodine crystals lying in a bed in the bottom portion of the reservoir and being of a predetermined size sufficient to hold a quantity of water proportional to the maximum flow rate attainable through the conduit and such that a maximum concentration of 120 parts per million (milligrams per liter) is obtainable as an outflow from the côntainer when the supply of water is at least above freezing, the chamber below the reservoir containing a bed of filter material;
inlet means for the connection with the water supply and opening into the chamber, and outlet means opening from the reservoir above the iodine crystals, the inlet means comprising a first tube having an outlet portion opening into the chamber and the outlet means comprising a second tube opening into the reservoir above the bed of iodine crystals said second tube projecting into the reservoir and closed at the end thereof, and carrying a plurality of slots adjacent the closed end for the passage of water, the slots being of a size to prevent the passage of crystalline iodine therethrough, whereby all said water portion throught the filter material and between the iodine crystals.

10. A device as claimed in claim 9 in which the filter material is sand.

11. A device as claimed in claim 9 including a retention tank connected with the outlet means.

12. A device as claimed in claim 9 including means to introduce a detergent into the conduit downstream from the reservoir outlet means.

13. A device as claimed in claim 9 including a holding tank connected with the outlet means, and means to draw water from holding tank into a further conduit of liquid proportional to the flow therethrough.

14. A device as claimed in claim 9 including a dispenser connected to the outlet means of the container.

15. A device as claimed in claim 9 in which the container is a polyvinylchloride having an outer coating of light reflective metal.

16. A device as claimed in claim 15 in which the metal is aluminum.

17. A device as claimed in claim 9 in which the inlet tube has a diameter larger than the diameter of the outlet tube.

18. A device as claimed in claim 9 including a refractor in the lower portion of the reservoir.

19. A device as claimed in claim 9 in which a perforated plate divides the container into the chamber and the reservoir, the chamber containing said filter material.

20. A device as claimed in claim 19 in which the filter material is sand.

21. A device as claimed in claim 19 in which the inlet tube has a diameter larger than the outlet tube.

* * * * *